United States Patent [19]

Nellums

[11] Patent Number: 5,065,855
[45] Date of Patent: Nov. 19, 1991

[54] SELF-ENERGIZING SPLINES FOR A SYNCHRONIZER

[75] Inventor: Richard A. Nellums, Chorley, England

[73] Assignee: Eaton Corporation, Cleveland, Ohio

[21] Appl. No.: 632,882

[22] Filed: Dec. 24, 1990

[51] Int. Cl.$^5$ .............................................. F16D 23/06
[52] U.S. Cl. ................................. 192/53 E; 192/53 F
[58] Field of Search ................. 192/53 E, 53 F, 53 R, 192/52, 66, 67 P, 70.2

[56] References Cited

U.S. PATENT DOCUMENTS

| | | | |
|---|---|---|---|
| 2,410,511 | 11/1946 | Letsinger et al. | 192/53 |
| 2,896,760 | 7/1959 | Hebbinghaus | 192/53 |
| 2,978,083 | 4/1961 | Henyon | 192/114 |
| 3,221,851 | 12/1965 | Vandervoort | 192/53 |
| 3,548,983 | 12/1970 | Hiraiwa | 192/53 |
| 3,804,218 | 4/1974 | Krutashou | 192/53 E |
| 3,910,390 | 10/1975 | Eichinger | 192/53 E |
| 4,018,319 | 4/1977 | Thomas | 192/53 E |
| 4,413,715 | 11/1983 | Michael et al. | 192/53 F |
| 4,836,348 | 6/1989 | Knödel et al. | 192/53 F |
| 4,869,353 | 9/1989 | Ohtsuki et al. | 192/53 F |

*Primary Examiner*—Allan D. Herrmann
*Assistant Examiner*—William O. Trousdell
*Attorney, Agent, or Firm*—P. S. Rulon

[57] ABSTRACT

A pin-type, double-acting synchronizer mechanism (22) includes friction clutches (24,36 and 26,38), jaw clutches (28,14b,16b), self-energizing ramps, (13f,13g,13h,13i and 29e,29f,29g,29h), and springs (33) to limit the maximum self-energizing or additive force provided by the ramps. The ramps act between a shaft (12) and clutch member (28). A shift flange (32) is rotatably fixed to the clutch member (28) by splines (32a,30) which allow relative axial movement against the force of the springs (33). The clutch member (28) and the shaft (12) include mating splines (29,13) divided into spline portions (29a,29b,29c,29d and 13a,13b,13c,13d,13e) to define the ramps to control limited relative rotation between the jaw clutch (28) and shaft (12), and to provide surface area and structural strength for transmitting full torque between the shaft and gears.

10 Claims, 3 Drawing Sheets

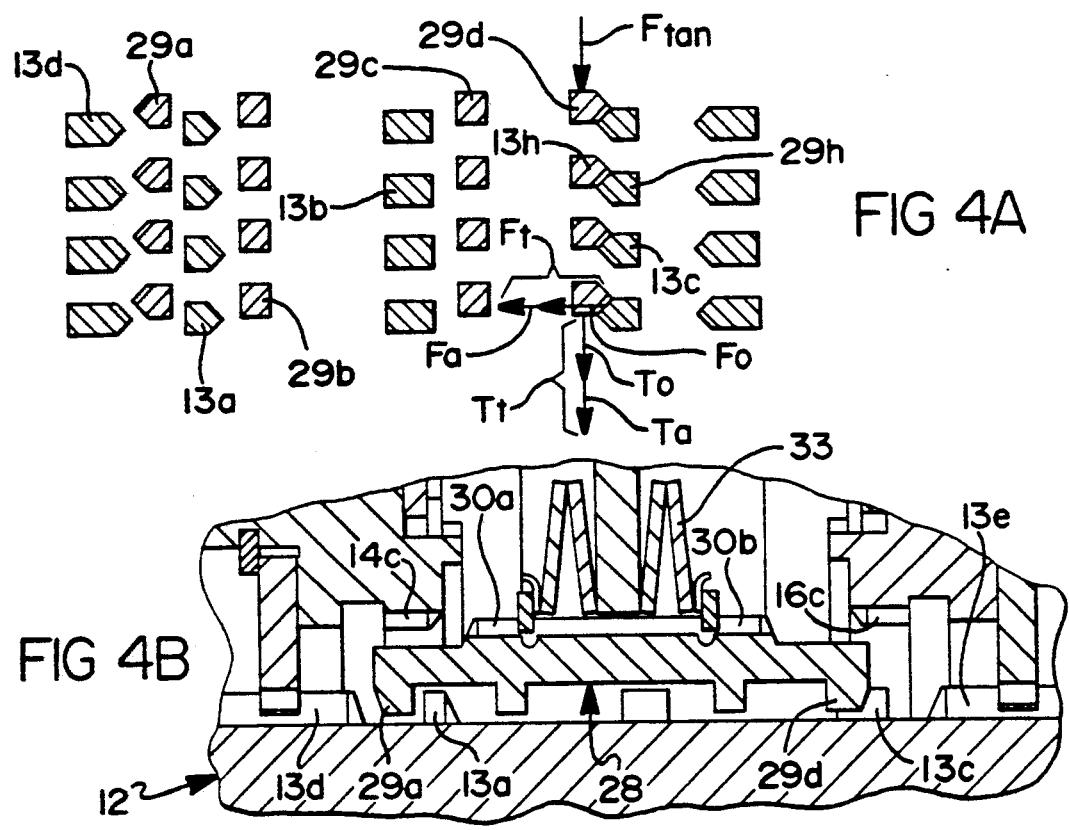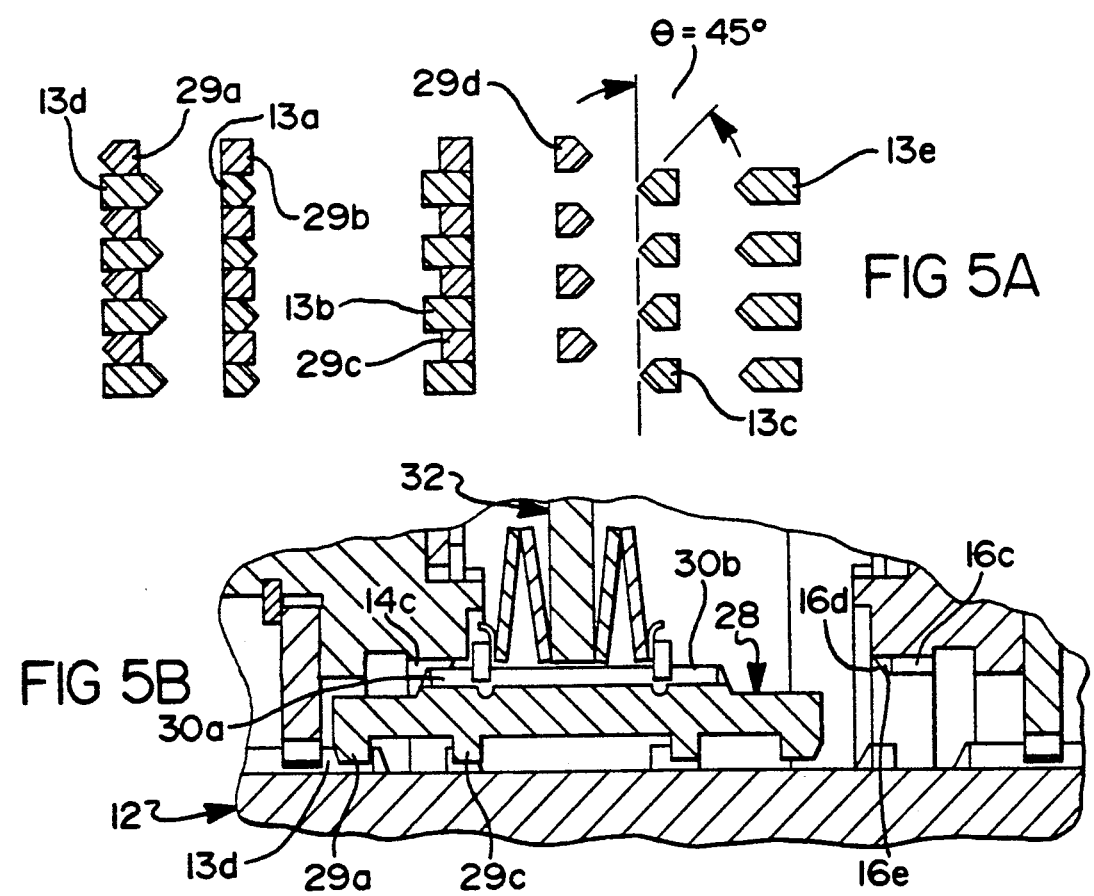

SELF-ENERGIZING SPLINES FOR A SYNCHRONIZER

CROSS-REFERENCE TO RELATED APPLICATIONS

This application is related to U.S. application Ser. Nos. 07/632880, 07/632881, 07/632883, 07/632884, 07/633703, 07/633704, 07/633738, 07/633739, 07/633743, and 07/633744, all filed 12-24-90, all assigned to the assignee of this application, and all incorporated herein by reference.

FIELD OF THE INVENTION

This invention relates to synchronizer mechanisms for a transmission. More specifically, the invention relates to such mechanisms of the self-energizing type.

BACKGROUND OF THE INVENTION

It is well known in the multiple ratio transmission art that synchronizer mechanisms may be used to reduce shift time of all or some of the transmission gear ratios. It is also known that the shift effort required by a vehicle operator, i.e., force applied to a shift lever, may be reduced by use of synchronizer mechanisms of the self-energizing type. Since operator shift effort generally increases with vehicle size and weight, synchronizer mechanisms of the self-energizing type are especially important for heavy duty trucks. Prior art examples of such mechanisms may be seen by reference to U.S. Pat. Nos. 2,410,511; 2,896,760; 3,548,983; 4,413,715; 4,836,348; and 4,869,353 which are incorporated herein by reference.

The synchronizer mechanisms of the above patents include friction and jaw members for respectively synchronizing and positive clutching a gear to a shaft; blockers engaged in response to a pre-energizer effecting initial engagement of the friction members in response to initial engaging movement of one of the jaw members by a shift force, the blockers being operative to prevent asynchronous engagement of the jaw members and to transmit the shift force to the friction members to increase synchronizing torque thereof; and self-energizing ramps reacting the torque to provide an additional force in the direction of and additive to the shift force for further increasing the synchronizing torque of the friction members. The basic purpose of such self-energizing synchronizer mechanisms is of course to provide faster synchronizing times with relatively moderate shift force from a manually operated shift lever for example.

The structure of the synchronizer mechanisms in these patents differs substantially from the structure of pin-type synchronizer mechanisms. Due, at least in part, to these structural differences, it has been difficult to provide pin-type synchronizer mechanisms with the self-energizing feature mentioned above.

SUMMARY OF THE INVENTION

An object of this invention to provide a pin-type synchronizer with self-energizing means.

According to a feature of the invention, a pin-type synchronizer mechanism is provided for first and second axially spaced apart gears mounted for rotation and secured against axial movement on shaft means having an axis about which the gears and shaft rotate. The mechanism comprises gear friction and jaw means affixed to each gear. The friction means are engagable with first and second axially spaced apart and axially movable friction means for respectively synchronizing the first and second gears with the shaft. The jaw means are engagable with axially movable jaw means defined by a clutch member including axially extending internal spline teeth having flank surfaces disposed for mating relation with flank surfaces of external spline teeth affixed to the shaft. A flange extends radially between the first and second friction means for axially moving the axially movable friction and jaw means from a neutral position into the engagement in response to an axially bi-directional shift force applied to the flange. Means are provided to secure the flange against rotational movement relative to the clutch member. Blocker means are operative when engaged for preventing engagement of the jaw means prior to the synchronizing. The blocker means includes a plurality of circumferentially spaced pins rigidly extending axially from the first and second friction means and into openings of the flange. Each pin has axially spaced apart blocker shoulders engagable with blocker shoulders defined on opposite sides of the flange and about the associated opening. Pre-energizer means are provided for engaging either one of the first and second friction means in response to initial axial movement of the flange by the shift force from the neutral position toward one of the gears for engaging the blocker means in response to engagement of the friction means producing a synchronizing torque transmitted to the flange via the pins and for transmitting the shift force to the engaged friction means via the engaged blocker means to increase the engaging force of the engaged friction means.

The improvement is characterized by:

the external spline teeth each including first, second, third and fourth axially spaced apart spline teeth portions. The first and second portions are axially disposed between the third and fourth portions and have axially facing ends defining at least one self-energizing ramp surface. The internal spline teeth include at least fifth and sixth axially spaced apart spline teeth portions having axially oppositely facing ends defining at least one self-energizing ramp surface. Flank surfaces of the first and second portion respectively mate with flank surfaces of the fifth and sixth portions during the neutral position of jaw member. The flank surfaces of the fifth and sixth portions respectively mate with flank surfaces of the third and fourth portions during the engaged position of the clutch member jaw means with the first and second gear jaw means, respectively. The ramp surfaces of the second and sixth portions engage in response to synchronizing torque in one direction from the first friction means for producing an axial additive force on the flange in the direction of the first friction means. The ramp surfaces of the first and fifth portions engage in response to synchronizing torque in one direction from the second friction means for producing an axial additive force on the flange in the direction of the second friction means.

BRIEF DESCRIPTION OF THE DRAWINGS

The synchronizer mechanism of the invention is shown in the accompanying drawings in which:

FIGS. 4A and 4B illustrate the ramps in a self-energizing position; and

FIGS. 5A and 5B illustrate the ramps when the synchronizer mechanism is an engaged or clutch position.

DETAILED DESCRIPTION OF THE DRAWINGS

Figure 1:
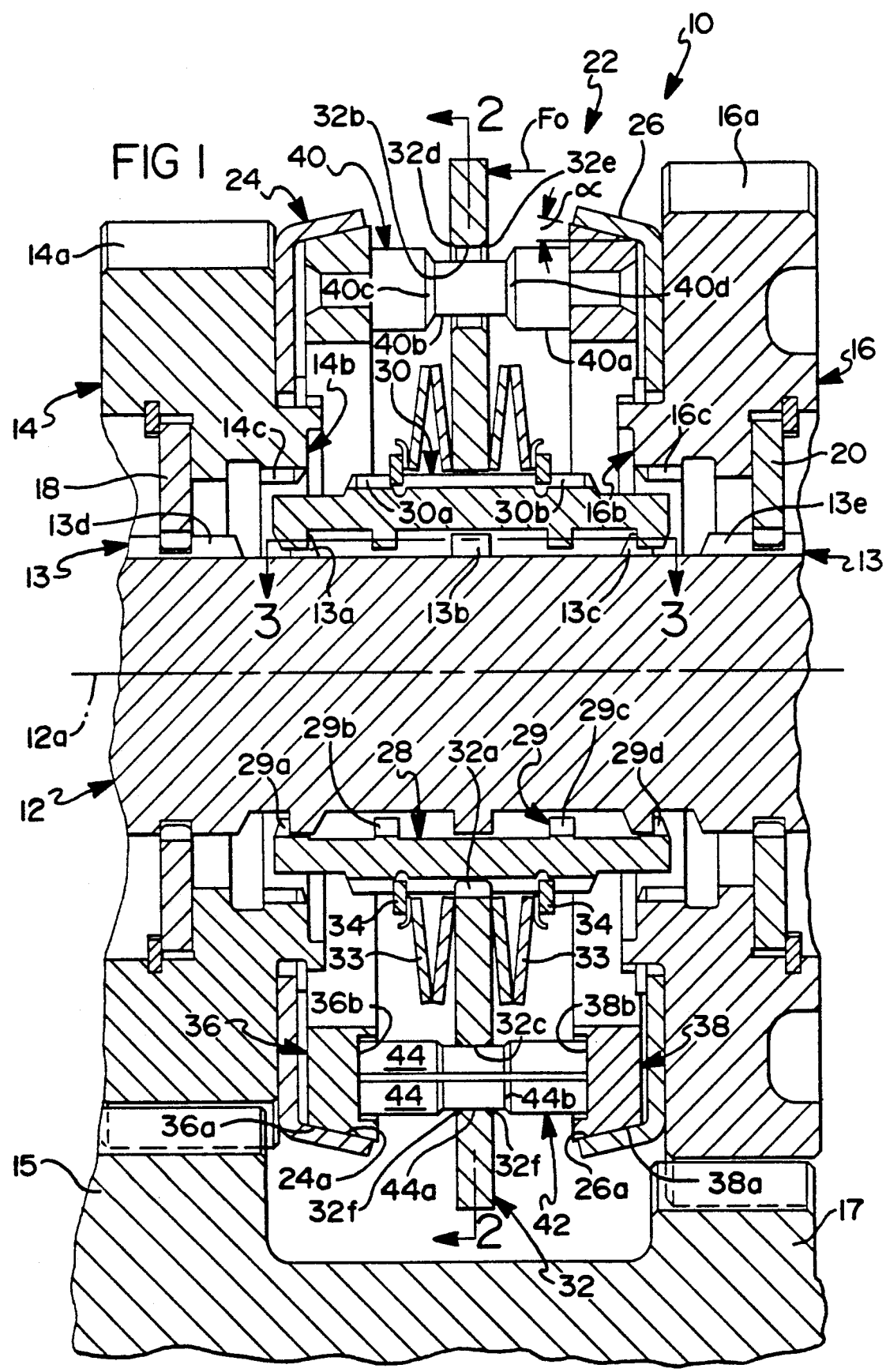
FIG. 1 is a sectional view a double-acting synchronizer mechanism looking along line 1—1 of FIG. 2.
Figure 2:
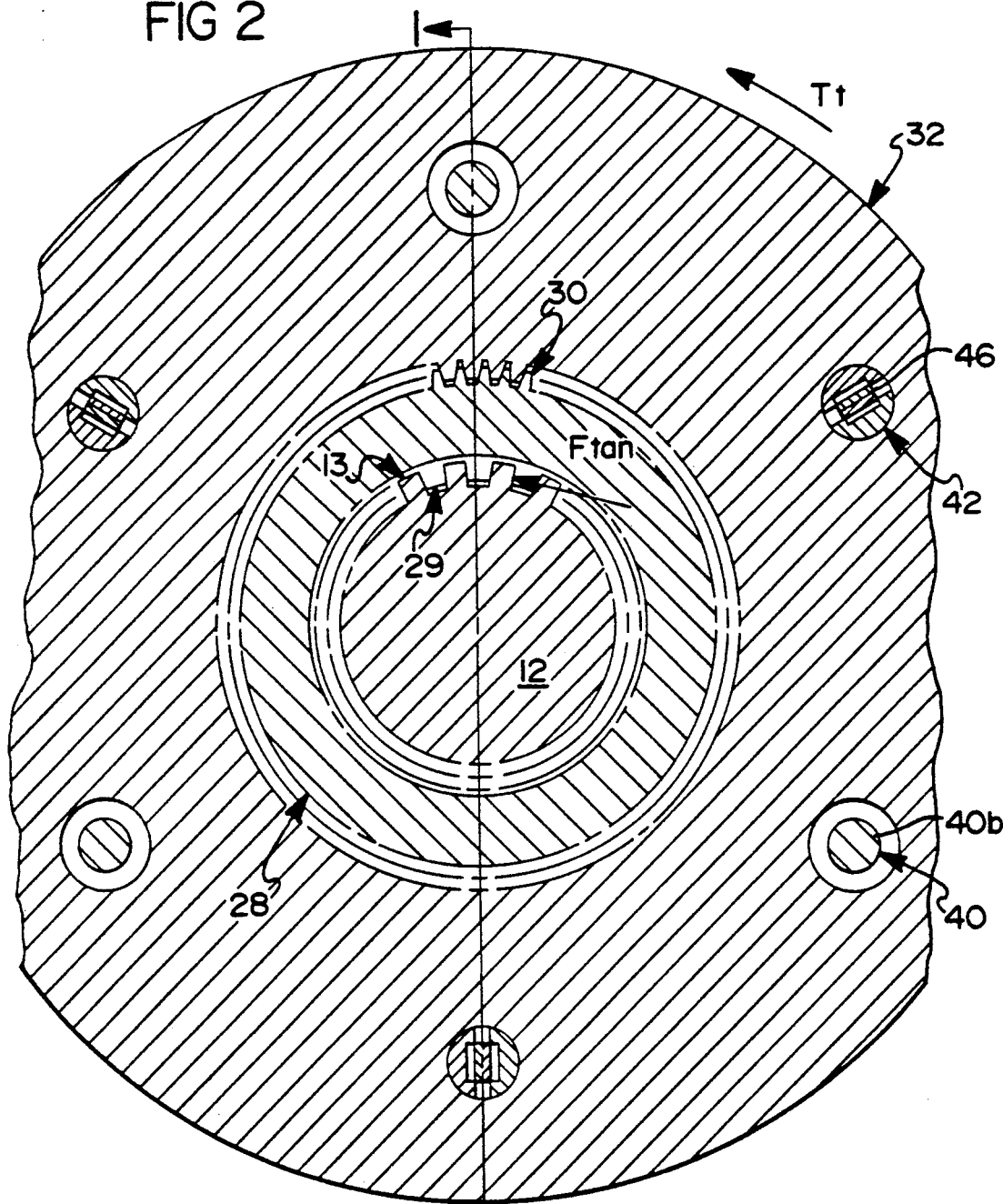
FIG. 2 is a partially sectioned view looking along line 2—2 of FIG. 1.
Figure 3:
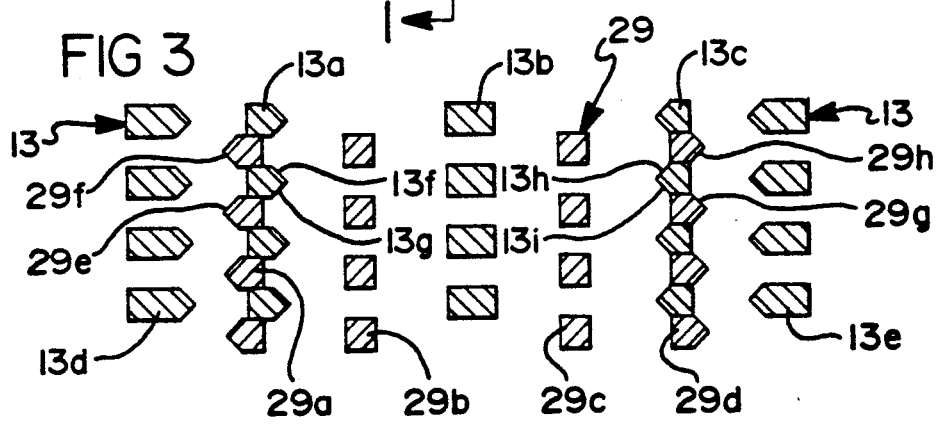
FIG. 3 partially illustrates the position of self-energizing ramps when the mechanism is in a neutral or declutched position of FIGS. 1 and 2.

Looking first mainly at FIGS. 1-3, therein is shown a gear and synchronizer assembly 10 for an otherwise unshown transmission of the type intended for use in a land vehicle, particularly of the type used in heavy duty trucks. However, assembly 10 may be used in other applications. The assembly includes a shaft 12 mounted for rotation about a central axis 12a in unshown manner, spaced apart ratio gears 14,16 rotatably supported on the shaft and secured against axial movement relative to the shaft by annular thrust members 18,20 affixed to the shaft in known manner, and a double-acting pin-type synchronizer clutch mechanism 22. When assembly 10 is part of a twin countershaft transmission, such as disclosed in U.S. Pat. Nos. 3,648,546 and 4,788,889, which patents are incorporated herein by reference, teeth 14a,16a on the gears will be in constant mesh with engine driven gears 15,17 on countershafts, shaft 12 will be connected to or selectively connectable to a load, and shaft 12 will be free to move somewhat radially as is well known in the prior art. Herein gear 14 represents a lower speed ratio gear than does gear 16; both may be up and down shifted into.

The synchronizer mechanism 22 includes annular friction members 24,26 and jaw clutch members 14b,16b affixed to gears 14,16, a jaw clutch member 28 having internal spline teeth 29 with flank surfaces slidably matable with flank surfaces of external spline teeth 13 integrally formed with the shaft or otherwise affixed thereto and external spline teeth 30, a radially extending shift flange 32 having internal spline teeth 32a mating with external spline teeth 30 and biased to the position of FIG. 1 by forces of spring washers 33 axially retained on jaw clutch member 28 by thrust members 34, annular friction members or rings 36,38 rigidly secured together by three circumferentially spaced apart pins 40 extending axially from each of the friction members and through openings 32b in the flange, and three circumferentially spaced apart pre-energizer assemblies 42 of the split pin-type extending axially between the friction members and through openings 32c alternately spaced between openings 32b. Opposite ends of jaw member external splines define jaw teeth 30a,30b which respectively mate with internal jaw teeth 14c,16c of jaw members 14b,16b to effect positive connection of the gears to the shaft. Mating spline teeth 30,32a allow relative sliding movement between jaw member 28 and flange 32, and prevent relative rotational movement therebetween. Splines 29,13 have portions thereof removed to define self-energizing ramps as explained further hereinafter.

Alternatively, synchronizer mechanism 22 may be of the single-acting pin-type, i.e., configured to synchronize and jaw clutch only one gear to a shaft; such a mechanism is disclosed in U.S. Pat. No. 3,221,851 which is incorporated herein by reference. Pins 40 may be more or less in number than disclosed herein and other types of pre-energizer assemblies 42 may be used. Further, mechanism 22 may be other than the pin-type.

As is readily seen, friction members 24,36 and 26,38 pair up to define friction clutches for synchronizing the gears to the shaft prior to engagement of the jaw clutches. Cone clutches are preferred; however, other types of friction clutches may be used. Friction members 24,26 may be affixed to the associated gears in any of several known ways, e.g., by welding, or, as is known in the art, they may be formed integral with the gears. Friction members 24,26 have internal cone friction surfaces 24a,26a which respectively mate with external cone friction surfaces 36a,38a. Members 24,26 and 36,38 also are respectively referred to as synchronizer cups and rings.

A wide range of cone angles may be used; herein, cone angles of between twelve degrees and seven and one-half degrees are contemplated. The friction surfaces 36a,38a and/or 24a,26a may be defined by any of several known friction materials affixed to the base member; herein, a pyrolytic carbon friction material, such as disclosed in U.S. Pat. Nos. 4,700,823; 4,844,218; and 4,778,548 is preferred. These patents are incorporated herein by reference.

Each pin 40 includes major diameter portions 40a having diameters slightly less than the diameter of flange openings 32b, a reduced diameter or groove portion 40b spaced between friction rings 36,38 (herein midway), and conical blocker shoulders or surfaces 40c,40d extending radially outward from the pin axis and axially away from each other at angles relative to a line normal to the pin axis. The grooved portions, when disposed within their respective flange openings, allow limited rotation of the rigid friction ring and pin assembly relative to the flange to effect engagement of the pin blocker shoulders with chamfered blocker shoulders 32d,32e defined about the flange openings. The blocker shoulders, when engaged, prevent engagement of the jaw clutches until synchronism or substantial synchronism is reached.

Pre-energizer assemblies 42 are of the split pin-type disclosed in U.S. Pat. No. 4,252,222 which is incorporated herein by reference. Each assembly 42 includes a pair of semi-cylindrical shell halves 44 having a major diameter less than the diameter of openings 32c when squeezed together, semi-annular grooves 44a with chamfered ends 44b and a leaf spring 46 for biasing the annular grooves apart to engage the groove chamfers with flange chamfers 32f formed about opposite ends of openings 32c. The ends of the shell halves 44 abut friction rings 36,38 and are disposed within elongated recesses 36b,38b therein.

Shaft splines 13, four of which are schematically illustrated in FIGS. 3, 4A, and 5A, include spline tooth portions 13a,13b,13c,13d,13e which are axially spaced apart by removal or omission of portions of spline teeth 13. Tooth portion 13a,13c include self-energizing ramp surfaces 13f,13g and 13h,13i. In an analogous manner, the jaw clutch member internal splines 29 include tooth portions 29a,29b,29c,29d which are axially spaced apart by removal or omission of portions of spline teeth 29. Tooth portions 29a,29d include self-energizing ramp surfaces 29e,29f and 29g,29h.

When it is desired to couple either gear to the shaft, an appropriate and unshown shift mechanism connected to the outer periphery of flange 32 in known manner moves the flange axially along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever. Whether manually or automatically applied, the force is applied to flange 32 in an axial direction and is represented by arrow $F_0$ in FIG. 4A.

When shift flange 32 and jaw member 28 are in the neutral position of FIGS. 1, 2, and 3, jaw member 28 is secured against rotation relative to the shaft by the close sliding mesh of spline portions 13$a$,29$a$ and 13$c$,29$d$. When jaw teeth 30$a$ or 30$b$ of member 28 are in mesh with jaw teeth 14$c$ or 16$c$ of gears 14 or 16, three of the spline portions of the shaft and the jaw members are in close mesh with each other to provide sufficient spline surface area and structural strength for transmitting full load torque between the shaft and the gears. As may be seen in FIGS. 5A and 5B wherein jaw teeth 30$a$,14$c$ are in mesh, shaft spline portions 13$d$,13$a$,13$b$ are respectively in close mesh with jaw member spline portions 29$a$,29$b$,29$c$. Further, it may be seen that the self-energizing ramps are not engaged and therefore are not subjected to wear due to full load torque transmission between the gears and shaft.

When flange 32 and jaw member 28 are initially moved axially from the neutral position toward either of the gears, jaw member spline portions 29$a$,29$d$ respectively move out of their close sliding mesh with shaft spline portions 13$a$,13$c$ to allow limited rotation of flange 32 and jaw member 28 relative to shaft 12. This initial flange movement engages the chamfered ends of pre-energizers 42 for transferring flange movement to the friction rings and effecting initial frictional engagement with one of the friction member cones. The initial frictional engagement provides an initial synchronizing torque for rotating blocker pins 40 relative to flange openings 32$b$ to effect engagement of the flange and pin blocker shoulders, and for engaging the self-energizing ramps to provide an additive axial force $F_a$ (FIG. 4A) for increasing the total engaging force $F_t$ of the cone clutch and the synchronizing torque provided thereby. For reasons explained further hereinafter, the additive force $F_a$ may exceed desired values; accordingly, the additive force $F_a$ is transferred from jaw member 28 to flange 32 via washer springs 33 which limit the maximum value of force $F_a$.

The axial spacing between the spline portions is such that relative rotation between shaft 12 and jaw member 28 is maintained while the jaw member is being moved from the neutral position of FIGS. 1 and 3 to the engaged position with one of the gears. For example, during movement of member 28 toward gear 14 as illustrated in FIGS. 4A and 4B, the direction of synchronizing torque has engaged self-energizing ramp surfaces 13$h$,29$h$ to produce the additive axial force $F_a$ in the direction of gear 14. While the ramp surfaces are engaged and thereby limiting the extent of relative rotation, the mutually facing axial ends of spline portion 13$d$,29$a$ are axially spaced apart enough to not contact and interfere with the action of the self-energizing ramp surfaces. As synchronization is reached and the blocker shoulders of flange 32 and pins 40 disengage to permit continued leftward movement of the jaw member, the leading ends of spline portions 29$a$ enter the spaces between spline portions 13$d$ prior to complete separation of ramp surfaces 13$h$,29$h$, whereby the limited relative rotational relation between the shaft and jaw member is maintained. The wedge shape of the leading ends of spline portions 13$d$,29$a$ clock the spline portions into proper alignment to allow completion of the shift as shown in FIGS. 5A and 5B. In an analogous manner, during movement of jaw member 28 toward gear 16, the self-energizing ramp surfaces of spline portions 13$a$,29$a$ engage to limit relative rotation and the leading axial ends of spline portions 29$d$ enter the spaces between spline portions 13$e$ as the shift is being completed.

Ramp surfaces may be provided for synchronizing one or both gears and/or for synchronizing in response to torque in either direction, as is encountered for up and down shifts. By way of example only, ramp surfaces 13$h$,13$i$,29$g$,29$h$ provide the additive axial force to increase synchronization of gear 14 in response to torque in either direction, and ramp surfaces 13$f$,13$g$,29$e$,29$f$ provide the additive axial force for gear 16 in response to torque in either direction. The angles of the ramp surfaces may be varied to provide different amounts of additive axial force for up and down shifts and for shifts into high and/or low speed ratios. Also, if no additive axial force is preferred in one direction for one gear or more, the ramp surfaces may be parallel to the shaft splines. For example purposes only, matable ramp surfaces 13$h$,29$h$ and/or 13$f$,29$f$ may be parallel to the shaft axis 12$a$ to provide no additive axial force in response to synchronizing torque while upshifting into gears 14,16.

More specifically with respect to a shift into gear 14, initial axial leftward movement of flange 32 by the shift mechanism engages flange chamfers 32$f$ with pre-energizer chamfers 44$b$ to effect movement of friction ring surface 36$a$ into engagement with friction surface 24$a$. The initial engagement force of friction surfaces 36$a$,24$a$ is of course a function of the force of springs 46 and the angles of the pre-energizer chamfers. The initial frictional engagement (provided an asynchronous condition exists and momentarily ignoring the effect of the self-energizing ramps) produces an initial cone clutch engaging force and synchronizing torque $T_o$ which ensures limited relative rotation between flange 32 and the engaged friction ring, and hence, movement of the reduced diameter pin portions 40$b$ to the appropriate sides of the flange openings 32$b$ to provide engagement of pin blocker shoulders 40$c$ with flange blocker shoulders 32$d$. When the blocker shoulders are engaged, full operator shift force $F_o$ on flange 32 is transmitted to friction ring 36 via the blocker shoulders, whereby the cone clutch is engaged by the full force of the operator shift force $F_o$ to provide a resultant operator synchronizing torque $T_o$. This operator synchronizing torque $T_o$ is represented by arrow $T_o$ in FIG. 4A. Since the blocker shoulders are disposed at angles relative to the axial direction of operator shift force $F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker shoulders move the pins into concentric relation with openings 32$b$ to allow continued axial movement of the flange and engagement of the external jaw teeth 30$a$ of jaw member 28 with internal jaw teeth 14$c$ of jaw member 14$b$. As is known in the prior art and as is specified by reference numbers only for jaw member 16$b$, the lead portions of the jaw teeth 16$c$ in FIG. 4B have rake leading edges 16$d$ to reduce tooth damage during initial contact, and have chamfer or wedge faces 16e to clock the teeth into mating alignment. Jaw teeth with such lead portions are disclosed in greater detail in U.S. Pat. No. 4,246,993 which is incorporated herein by reference along with U.S. Pat. No. 3,265,173 which provides a teaching for the proper rake angles. The wedge faces, which may be asymmetric, prevent delay of shift completion due to abutting contact of the leading edges of the teeth. To facilitate smooth and relatively effortless completion of shifts, the jaw teeth are preferably as fine or small, as practicable, in the circumferential direction, thereby minimizing the number or rotational clocking degrees necessary to matingly align the jaw teeth. In an analogous manner, the lead portions of spline teeth 13$d$, 13$e$ are provided with rake leading edges and chamfer or wedge faces for improved engagement with the self-energizing ramp surfaces of jaw clutch tooth portions 29$a$, 29$d$, respectively.

Still ignoring the effects of the self-energizing ramps, cone clutch torque provided by the force $F_o$ is expressed by equation (1).

$$T_o = F_o R_c \mu_c / \sin \alpha \tag{1}$$

where:

$R_c$ = the mean radius of the cone friction surface,
$\mu_c$ = the coefficient of friction of the cone friction surface, and
$\alpha$ = the angle of the cone friction surfaces.

Looking now at the affects of the self-energizing ramps and referring particularly to FIGS. 4A and 4B, the synchronizing torque $T_o$, due to the operator applied axial shift force $F_o$, is of course transmitted to flange 32 and jaw member 28 by pins 40. The torque $T_o$ is reacted to shaft 12 across the self-energizing ramp surfaces. The self-energizing ramp surfaces limit rotation of the flange and jaw member relative to shaft 12, and produce an axial force component or axial additive force $F_a$ acting on the flange in the same direction as shift force $F_o$, thereby further increasing the engaging force of the cone clutch to provide an additive synchronizing torque $T_a$ which adds to the torque $T_o$. As previously mentioned, FIG. 3 illustrates the position of the self-energizing ramp surfaces while shift flange 32 is in the neutral position corresponding to the position of FIGS. 1 and 2 and FIGS. 4A and 4B illustrate a position of the ramps while gear 14 is being synchronized by engaged cone surfaces 24$a$, 36$a$. In the example of FIGS. 4A and 4B, the engaged cone surfaces are producing a synchronizing torque in a direction which has effected engagement of self-energizing ramp surfaces 13$h$, 29$h$. Hence, the sum of the axial forces for engaging the cone clutch is $F_o$ plus $F_a$ and the sum of the synchronizing torques being produced by the cone clutch is $T_o$ plus $T_a$. The forces and torque are graphically shown in FIG. 4A. For a given operator shift force $F_o$ and an operator synchronizing torque $T_o$, the magnitude of the axial additive force $F_a$, without the effect of washer springs 33 is a function of several variables. The main variables for calculating the additive force $F_a$ are the angles $\theta$ of the self-energizing ramps shown in FIG. 5A, angles $\alpha$ of the cone clutches shown in FIG. 1, coefficient of friction $\mu_c$ of the cone clutch, and mean radii ratio $R_c$ of the cone clutch and $R_r$ of the self-energizing ramps.

The total synchronizing torque $T_t$ produced by the cone clutch is:

$$T_t = F_t R_c \mu_c / \sin \alpha \tag{2}$$

where $$T_t = T_o + T_a \tag{3}$$

and $$F_t = F_o + F_a \tag{4}$$

The additive force $F_a$ is preferably great enough to significantly increase synchronizing torque and decrease synchronizing time in response to moderate shift force effort $F_o$ by the operator. The force $F_a$, as mentioned above is, a function of the self-energizing ramp angles and several other variables, such as, the angles $\alpha$ of the cone clutch friction surfaces, the coefficient of friction $\mu_c$ of the friction surfaces, and the mean radii ratio $R_c$ of the cone clutch and $R_r$ of the self-energizing ramps. The force $F_a$ is also a function of the pressure angle of the self-energizing ramps. Herein, the pressure angle is taken as zero and therefore does not affect the value of $F_a$. In theory, fixed or constant values may be selected for the variables to provide forces $F_a$ which significantly increase synchronizing torque for moderate shift force efforts $F_o$ and to provide forces $F_a$ which increase and decrease respectively in response to the force $F_o$ increasing and decreasing. However, in practice such theoretical results are difficult to obtain, particularly when the variables are selected to provide maximum or near maximum controllable forces $F_a$, i.e., forces $F_a$ which increase and decrease in response to all operator shift force efforts $F_o$. This difficulty is due mainly to variations in the so-called fixed variables during manufacture and while in use. Accordingly, by using springs 33 to limit the maximum force of force $F_a$, the synchronizer mechanism may be configured to theoretically provide maximum or over maximum forces $F_a$ and then to reduce or limit the forces to a desired value by the use of springs 33.

A preferred embodiment of self-energizing synchronizer mechanism has been disclosed. Many variations and modifications of the preferred embodiment are believed to be within the spirit of the invention. The following claims are intended to cover the inventive portions of disclosed mechanism and variations and modifications believed to be within the spirit of the invention.

What is claimed is:

1. A pin-type synchronizer mechanism for first and second axially spaced apart gears mounted for rotation and secured against axial movement on shaft means having an axis about which the gears and the shaft means rotate, the mechanism comprising:

gear friction and jaw means affixed to each gear, the friction means engagable with first and second axially spaced apart and axially movable friction means for respectively synchronizing the first and second gears with the shaft, the jaw means engagable with axially movable jaw means defined by a clutch member including axially extending internal spline teeth having flank surfaces disposed for mating relation with flank surfaces of external spline teeth affixed to the shaft means;

a flange extending radially between the first and second friction means for axially moving the axially movable friction and jaw means from a neutral position into said engagement in response to an axially bi-directional shift force ($F_o$) applied to the flange means securing the flange against rotational movement relative to the clutch member;

blocker means operative when engaged for preventing engagement of the jaw means prior to the synchronizing, the blocker means including a plurality of circumferentially spaced pins rigidly extending axially from the first and second friction means and into openings of the flange, each of the pins having axially spaced apart blocker shoulders engagable with blocker shoulders defined on opposite sides of the flange and about the associated opening;

pre-energizer means for engaging either one of the first and second friction means in response to initial axial movement of the flange by the shift force ($F_o$) from the neutral position toward one of the gears for engaging the blocker means in response to engagement of the friction means producing a synchronizing torque transmitted to the flange via the pins and for transmitting the shift force ($F_o$) to the engaged friction means via the engaged blocker means to increase the engaging force of the engaged friction means; characterized by:

the external spline teeth defined by at least first, second, third, and fourth axially spaced apart spline teeth portions, the first and second portions axially disposed between the third and fourth portions and having axially facing ends defining at least one self-energizing ramp surfaces;

the internal spline teeth defined by at least fifth and sixth axially spaced apart spline teeth portions having axially oppositely facing ends defining at least one self-energizing ramp surface, flank surfaces of the first and second portions respectively mating with flank surfaces of the fifth and sixth portions during the neutral position of the jaw member, the flank surfaces of the fifth and sixth portions, respectively mating with flank surfaces of the third and fourth portions during the engaged position of the clutch member jaw means respectively with the first and second gear jaw means, the ramp surfaces of the second and sixth portions engaged in response to synchronizing torque in one direction from the first friction means for producing an axial additive force ($F_a$) on the flange in the direction of the first friction means, and the ramp surface of the first and fifth portions engaged in response to synchronizing torque in one direction from the second friction means for producing an axial additive force on the flange in the direction of the second friction means.

2. The synchronizer mechanism of claim 1, wherein: the internal spline teeth each include seventh and eighth spline teeth portions axially spaced between the fifth and sixth portions, the first and seventh portions mating during mating of the third and fifth portions, and the second and eighth portions mating during mating of the fourth and sixth portions.

3. The synchronizer mechanism of claim 2, wherein: the external spline teeth each include a ninth spline tooth portion axially spaced between the first and second portions, the eighth and ninth portions mating during mating third and fifth portions, and the seventh and ninth portions mating during mating of the fourth and sixth portions.

4. The synchronizer mechanism of claim 1, wherein: the synchronizing torques in the one direction being in the same direction; and the ends of the first, second, fifth, and sixth portions each include another ramp surface, the other ramp surfaces of the second and sixth portions engagable in response to synchronizing torque in a direction opposite the one direction, and the other ramp surfaces of first and fifth portions engagable in response to synchronizing torque in the opposite direction.

5. The synchronizer mechanism of claim 4, wherein: the internal spline teeth each include seventh and eighth spline teeth portions axially spaced between the fifth and sixth portions, the first and seventh portion mating during mating of the third and fifth portions, and the second and eighth mating during mating of the fourth and sixth portions.

6. The synchronizer mechanism of claim 5, wherein: the external spline teeth each include a ninth spline tooth portion axially spaced between the second and third portions, the eighth and ninth portions mating during mating third and fifth portions, and the seventh and ninth portions mating during mating of the fourth and sixth portions.

7. The synchronizer mechanism of claim 1, wherein: the self-energizing ramp surfaces limit relative rotation of the internal and external spline teeth when engaged;

the third and fifth portions, and the fourth and sixth portions respectively include ramp surfaces disposed for engagement in response to synchronism being reached and disengagement of the self-energizing ramps.

8. The synchronizer mechanism of claim 7, wherein: the internal spline teeth each include seventh and eighth spline teeth portions axially spaced between the fifth and sixth portions, the first and seventh portion mating during mating of the third and fifth portions, and the second and eighth mating during mating of the fourth and sixth portions.

9. The synchronizer mechanism of claim 8, wherein: the external spline teeth each include a ninth spline tooth portion axially spaced between the second and third portions, the eighth and ninth portions mating during mating third and fifth portions, and the seventh and ninth portions mating during mating of the fourth and sixth portions.

10. The synchronizer mechanism of claim 9, wherein: the synchronizing torque in the one direction being in the same direction; and the ends of the first, second, fifth, and sixth portions each include another ramp surface, the other ramp surfaces of the second and sixth portions engaged in response to synchronizing torque in a direction opposite the one direction, and the other ramp surfaces of first and fifth portion engaged in response to synchronizing torque in the opposite direction.

* * * * *